2 Sheets—Sheet 1.

R. VOSE.

Car Spring.

No. 1,420.

Reissued Feb. 24, 1863.

Witnesses:

Geo. H. B. Smith

Chas. Hadaway

Inventor:

Richard Vose

By his atty

J. C. Robbins

R. VOSE.

2 Sheets—Sheet 2.

Car Spring.

No. 1,420.

Reissued Feb. 24, 1863.

Witnesses:

Frederick W. Symons

R. Cryle Jr.

Inventor:

Richard Vose by his attorneys

Robbins & Burr

UNITED STATES PATENT OFFICE.

RICHARD VOSE, OF NEW YORK, N. Y.

IMPROVEMENT IN CAR-SPRINGS.

Specification forming part of Letters Patent No. 34,657, dated March 11, 1862; Reissue No. 1,420, dated February 24, 1863.

DIVISION A.

*To all whom it may concern:*

Be it known that I, RICHARD VOSE, of the city, county, and State of New York, have invented a new and Improved Car-Spring; and I do hereby declare that the following is a full and exact description thereof, reference being had to the accompanying drawings, which form a part of this specification—

Figure 2:
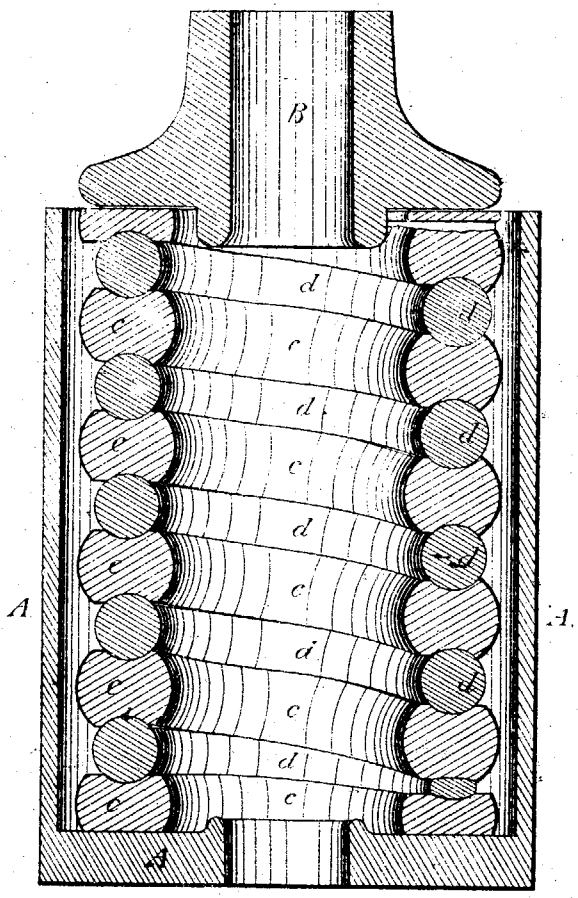
Figure 1:
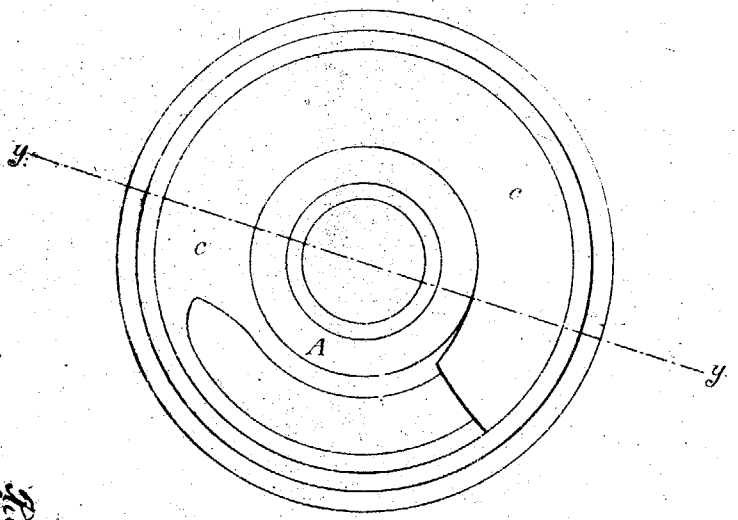
Figure 4:
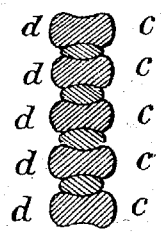
Figure 3:
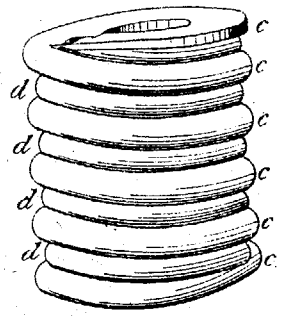

Figure 1 being a top view of said spring minus the bearing-follower B of the casing; Fig. 2, a section of the spring and its casing entire in the line *y y* of Fig. 1; Fig. 3, a perspective view thereof, and Fig. 4 a sectional view showing its operation under pressure.

It is well known that helical springs of the usual construction are speedily destroyed when they are placed in positions where they are subjected to violent concussive strains, and this peculiarity of said springs has almost entirely excluded them from use in all railway-vehicles; but I have found by experimental tests that helical or spiral springs can be made as durable and as reliable in all situations as any other character of springs by interposing some elastic, gummy, or fibrous substance between the coils of said helical or spiral springs, substantially in the manner represented in the accompanying drawings, and this improvement is the subject of my present application for Letters Patent.

In manufacturing my improved compound spring I first form a helix of longitudinally-channeled or fluted bars of steel or other suitable metal, *c c*, Fig. 2, made substantially as described in my additional application for Letters Patent bearing even date herewith, securing thereby the advantages of an increased surface of metal with diminished weight. With this metallic helix *c c*, I intertwine, by interposition between its coils, an additional coil, *d d*, of india rubber, vulcanized gutta-percha, or other equivalent elastically-yielding substance. The longitudinal channel, forming a concave surface on either side of the metallic coiled bar, receives and embraces the elastic rubber, and not only retains it securely in place, but gives a degree of homogeneity to the spring, rendering it both neat and compact, as appears clearly in the accompanying drawings. The compound spring thus formed of alternate coils of corrugated steel and vulcanized rubber (or their equivalents) may, when applied to railroad-cars, be placed in a cylindrical box, A, and be surmounted by a bearing-follower, B, as represented in Fig. 2. This, however, is but a single one of its numerous applications and modes of use.

From the experiments which I have made I believe that one of my said improved combination-springs weighing less than twenty pounds will perfectly perform the duty of an elliptic spring of eighty pounds in weight, and that the durability of my spring will in all cases be fully equal to that of the best elliptic spring under all circumstances.

Although in the construction of my improved spring I at present prefer to use corrugated or channeled bars of metal, I am aware that the beneficial result attained by the combination of some suitable, elastically-yielding substance with the metallic coils in my helical spring is not confined to its combination with any particular form or shape of the metal used in said spring, for the same result may be attained by completely enveloping the metallic coil with the rubber or other suitable elastic material; hence

What I claim as my invention, and desire to secure by Letters Patent, is—

The combination or interposition of a packing of elastic gum or its equivalent between the coils of a spiral or helical metallic spring, substantially in the manner and for the purpose herein set forth.

The above specification of my improvement in railroad-car springs signed and witnessed this 20th day of January, A. D. 1863.

RICHARD VOSE.

Witnesses:

CHARLES D. GIBSON,

A. L. BUTLER.